United States Patent [19]

Kobayashi et al.

[11] 4,065,342
[45] Dec. 27, 1977

[54] METHOD AND APPARATUS FOR PRODUCING SYNTHETIC RESIN TUBE

[75] Inventors: Mikio Kobayashi, Takatsuki; Isamu Nakano, Toyonaka, both of Japan

[73] Assignee: Sekisui Kagaku Kogyo Kabushiki Kaisha, Osaka, Japan

[21] Appl. No.: 741,129

[22] Filed: Nov. 11, 1976

Related U.S. Application Data

[62] Division of Ser. No. 544,665, Jan. 27, 1975, Pat. No. 4,009,069.

[30] Foreign Application Priority Data

Jan. 28, 1974 Japan .................................. 49-12089
Apr. 16, 1974 Japan .................................. 49-42871

[51] Int. Cl.² .......................................... B29D 23/10
[52] U.S. Cl. .................................................. 156/203
[58] Field of Search ............... 156/203, 466, 498, 499, 156/200-202, 467, 443, 218; 93/82, 94 R; 228/147, 151

[56] References Cited

U.S. PATENT DOCUMENTS

| | | | |
|---|---|---|---|
| 2,049,756 | 8/1936 | Asmussen et al. | 93/82 |
| 2,989,113 | 6/1961 | Jarund | 156/466 |
| 3,024,496 | 3/1962 | Colombo | 156/244 X |
| 3,388,017 | 6/1968 | Grinslet et al. | 156/498 |
| 3,650,868 | 3/1972 | Murota | 156/466 X |
| 3,758,364 | 9/1973 | Edelman | 156/467 X |
| 3,834,969 | 9/1974 | Doll | 156/466 |

FOREIGN PATENT DOCUMENTS 1,311,341 10/1962 France .................................. 156/466

*Primary Examiner*—David A. Simmons
*Attorney, Agent, or Firm*—Edwin E. Greigg

[57] ABSTRACT

Method and apparatus for producing a synthetic resin tube by deforming a strip of synthetic resin and joining both lateral surfaces of the deformed strip together while transporting the strip in its longitudinal direction.

7 Claims, 8 Drawing Figures

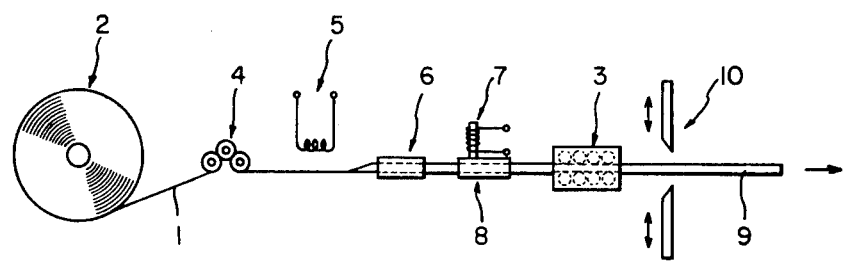
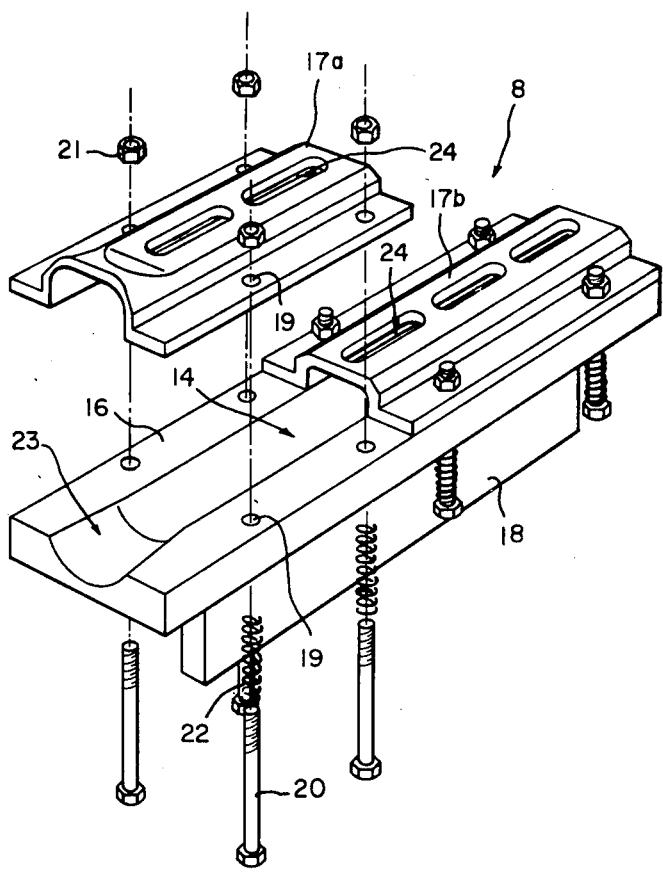

METHOD AND APPARATUS FOR PRODUCING SYNTHETIC RESIN TUBE

This is a Division, of application Ser. No. 554,665, filed Jan. 27, 1975, now U.S. Pat. No. 4,009,069.

BACKGROUND OF THE INVENTION

The present invention relates to improvements in a method and an apparatus for producing synthetic resin tubes by deforming a strip of synthetic resin into a tubular shape having an axis extending longitudinally of the strip and joining both lateral surfaces of the strip together while transporting the strip in its longitudinal direction.

Conventionally, a planar strip is deformed into a tubular shape by passing the strip through a first space having a gradually reducing width or peripheral length and subsequently sending the strip into a second space having a peripheral length substantially equal to the outer peripheral length of the tube to be obtained. With the conventional method or apparatus, however, the peripheral length of the second space is invariable, whilst the transverse dimension of a strip generally varies in its longitudinal direction. Consequently, where the strip has a greater width than is specified, the strip is subjected to higher resistance while travelling through the second space axially thereof, with the result that the pulling force to pass the strip through the second space stretches the strip, thereby varying the wall thickness of the resulting tube in its longitudinal direction. The increased resistance sometimes gives rise to such an accident that the strip is ruptured or becomes incapable of passing through the second space. Conversely, where the width of strip is smaller than the specified dimension, the strip passes through the second space with its side edges unjoined with each other. Thus it becomes impossible to obtain a tube or to bring the lateral surfaces into pressing contact with each other under high pressure to form a joint of sufficient strength.

This invention intends to overcome these problems heretofore experienced in the manufacture of synthetic resin tubes.

SUMMARY OF THE INVENTION

The method for producing a synthetic resin tube according to this invention comprises the steps of transporting a strip of synthetic resin in its longitudinal direction, deforming the strip into a tubular shape having an axis extending in the longitudinal direction of the strip and at the same time bringing both lateral surfaces of the strip into pressing contact with each other to join said surfaces while passing the strip through a restricted space during transport, and is characterized in that the diameter of the restricted space is adjustable in accordance with the variation of the transverse dimension of the strip in its longitudinal direction by utilizing the internal stress of the strip passing therethrough.

The apparatus for producing a synthetic resin tube according to this invention comprises feed means for transporting a strip of synthetic resin in its longitudinal direction, means for rendering a lateral surface of the strip adhesive during transport, means defining a restricted space for passing the strip therethrough during transport so that the restricted space deforms the strip into a tubular shape having an axis extending in the longitudinal direction of the strip and brings both lateral surfaces of the strip into pressing contact with each other to join said surfaces, the apparatus being characterized in that the restricted space defining means has a plurality of pressing members arranged along the periphery of the restricted space and movable relative to each other diametrically of the space, the pressing members including a movable member urged in a direction in which the diameter of the restricted space reduces.

Thus the diameter of the restricted space is automatically adjustable to the variation of the transverse dimension of the strip in its longitudinal direction, and the movable pressing member is always so urged as to reduce the diameter. This construction permits the strip to smoothly pass through the restricted space all the time irrespective of its transverse dimension and assures that the opposite lateral surfaces of the strip will be effectively brought into contact with each other. When the urging force acting to reduce the diameter of the restricted space is determined suitably in accordance with the material and/or dimensions of the strip, a contact pressure suitable for joining the lateral surfaces can be constantly maintained. In sum, the present method and apparatus are capable of reliably and continuously producing a synthetic resin tube which has a substantially uniform well thickness and a strong joint, free of any trouble such as interruption of the transport operation and repture of the strip.

The primary object of this invention is to provide a method and an apparatus in which, when a strip is deformed into a tubular shape and the lateral surfaces of the strip are joined by being passed through a restricted space, the strip can be passed through the space without being subjected to the marked variation of the resistance to be otherwise produced due to the variation of transverse dimension of the strip in its longitudinal direction, and the pressure of contact between the lateral surfaces is maintained at a substantially constant level so as to produce a tube free from variations in the wall thickness and defects in the joint with a troublefree transport operation.

Another object of this invention is to provide a method and an apparatus which are suitable for continuously producing a large quantity of synthetic resin tube from a strip of resin material.

Still another object of this invention is to provide an apparatus especially suitable for producing heat-insulating tube for pipes.

Other objects and advantages of this invention will become more apparent from the following description.

BRIEF DESCRIPTION OF THE DRAWINGS

FIG. 1 is a flow sheet showing an apparatus in its entirety;

FIG. 2 is a partly exploded perspective view showing means defining a restricted space;

DESCRIPTION OF THE PREFERRED EMBODIMENTS

Figure 3:
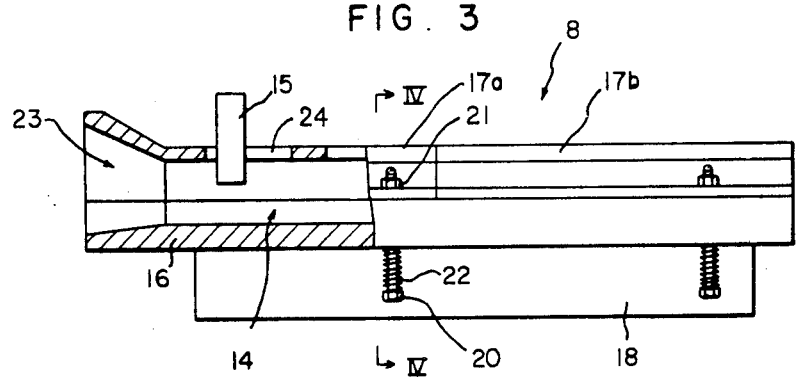
FIG. 3 is a side elevation partly broken away showing part of the restricted space defining means.
Figure 4:
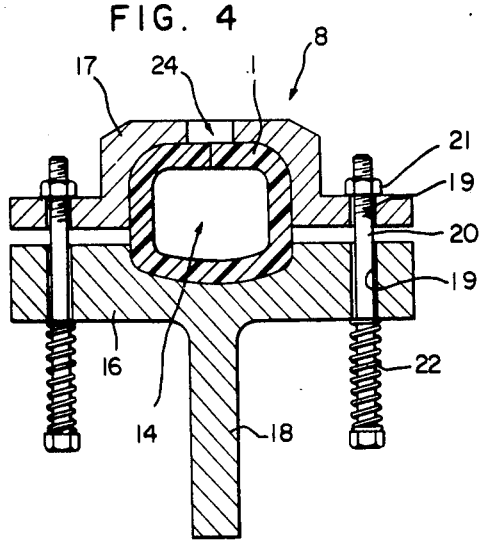
FIG. 4 is a view in section taken along the line IV—IV in FIG. 3.

With reference to FIG. 1, a strip 1 of thermoplastic synthetic resin is preferably continuously pulled out in its longitudinal direction from a roll 2 of the strip by rotating pinch rollers 3. Guide rollers 4 disposed close to the roll 2 prevent the strip 1 from creasing and maintain the strip 1 under regulated tension. Provided between the guide rollers 4 and the pinch rollers 3 are a heater 5 for heating the strip 1 to such state that the strip 1 is shapable with heating, or to such a degree that the strip will not return to its original shape when an external force is removed after it has been curved, namely to above the softening temperature of the strip 1, means 6 for curving the strip 1 about an axis extending in its longitudinal direction, means 7 for rendering the lateral surfaces of the strip 1 adhesive, and means 8 defining a restricted space through which the strip 1 passes during the transport. These means are arranged in the above-mentioned order in the direction of the transport of the strip 1. A cutter 10 for severing a tube 9 in predetermined lengths is positioned ahead of the pinch rollers 3 in the direction of the transport of the strip 1.

While being send forward, the strip pulled out from the roll 2 is heated by the heater 5 on at least one side, thereafter shaped to an approximate tubular form by the curving means 6 and rendered adhesive at one or both of its side edges by the means 7. Subsequently, the means 8 deforms the strip to a completely tubular shape, bringing the lateral surfaces into pressing contact with each other to join, and shapes the strip to a specified form while cooling the same with air. The tube 9 obtained is severed by the cutter 10 in suitable lengths for use. The tube obtained is given a property to permanently maintain the tubular shape through heating by heater 5. In using this tube as a cover for pipes, for example, the tubular shape is maintained when the tube 9 is cut apart in the axial direction, thereby rendering the covering work easy.

Examples of the thermoplastic synthetic resins to be used in this invention are varied and include polyethylene, polystyrene, polyamide. Especially preferable are relativley thick foamed resin materials for producing heat insulators for use with pipes.

The feed means for transporting the strip 1 in its longitudinal direction may be different from the foregoing embodiment; for example, the strip 1 may be bent in a zigzag manner and then pulled out by pinch rollers.

The heater 5, curving means 6 and means 7 for imparting adhering properties to the lateral surface or surfaces of the strip 1 can be arranged in a different order as desired, and the heater 5 and/or the curving means 6 can be omitted. When there is no need to sever the tube 9, means for taking up the tube 9 is provided in place of the cutter 10.

Figure 6:
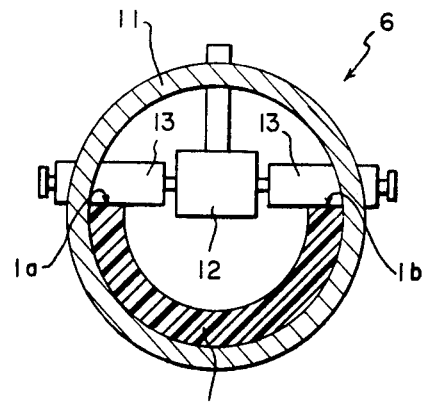
FIG. 6 is a view in cross section showing curving means.

As shown in FIG. 6, the curving means 6 comprises a pipe 11, a bearing 12 disposed within the pipe 11 preferably in a vertically shiftable manner and at least one pair of guide rollers 13 supported by the bearing 12. The strip 1 slides on the inner surface of the pipe 11, with its opposite lateral surfaces 1a and 1b in contact with the guide rollers 13 respectively, and is thereby deformed into a substantially trough-like shape in section. This assures that the strip 1 will be deformed into a specifed shape in the restricted space. The strip 1 can be deformed by the curving means 6 into a desired shape.

Usable as the heater 5 are various types of heaters such as the electric type employing a nichrome wire or infrared lamp and the combustion type employing a burner. The strip 1 is heated either on its opposite sides or on only one side thereof.

Figure 5:
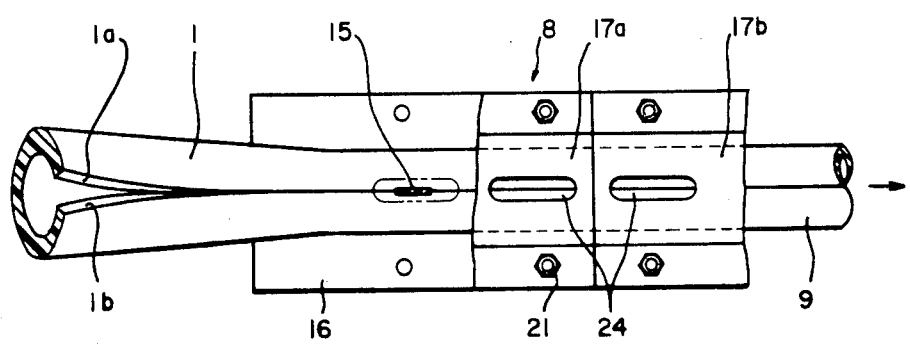
FIG. 5 is a plan view partly broken away showing the restricted space defining means.

FIGS. 3 and 5 show the means 7 for imparting adhering properties to the lateral surfaces 1a and 1b of the strip 1 which include a heating plate 15 inserted into the restricted space 14 close to its inlet and fixed to a suitable support member (not shown). When brought into sliding contact with the heating plate 15, the lateral surfaces 1a and 1b of the strip 1 are heated to a sufficiently high temperature to fuse to each other. The heating plate 15 is heated by an unillustrated heating element of the electric resistance type such as a nichrome wire which is wound around or enclosed in the plate 15. The heating plate 15 may be adapted to contact one of the lateral surfaces 1a and 1b of the strip. The heating plate 15 is replaceable by a roll or the like for applying an adhesive to at least one of the lateral surfaces 1a and 1b of the strip 1.

FIGS. 2, 3, 4 and 5 show the restricted space defining means 8 comprising a stationary member 16 surrounding approximately the lower half of the restricted space 14 and movable members 17a and 17b surrounding approximately the upper half of the restricted space 14. By a leg 18 extending from the stationary member 16, the member 16 is fixed to a suitable frame (not shown). The movable members 17a and 17b, aligned longitudinally of the restricted space, are mounted on the stationary member 16 with bolts 20 passed through bores 19 in the stationary and movable members 16, 17a and 17b, nuts 21 screwed on the bolts 20 and springs 22 provided between the heads of bolts 20 and the stationary member 16, each of the movable members 17a and 17b being vertically movable. The movable members 17a and 17b are urged by the force of gravity toward the stationary member 16, namely in the direction in which the diameter of the restricted space 14 reduces. Furthermore, when the movable members 17a and 17b are raised in accordance with the variation of the transverse dimension of the strip 1 in its longitudinal direction while the strip 1 passes through the restricted space 14 and by the action of internal stress of the strip 1, the springs 22 act to urge the movable members 17a and 17b toward the stationary member 16, the member 17a on the inlet side of the restricted space 14 being so urged with a greater force than the other member 17b on the outlet side. Consequently, the strip 1 passing through the restricted space 14 is deformed into a completely closed tubular shape, with the opposite lateral surfaces 1a and 1b of the strip brought into pressing contact with each other and thereby joined. The alteration in the diameter of the restricting space 14 in conformity with the variation in the transverse dimension of the strip 1 diminishes the variation of tension on the strip 1 in the longitudinal direction of the strip 1. The shift of the nuts 21 relative to the bolts 20 will control the urging force on the movable members 17a and 17b in conformity with the material and/or dimensions of the strip 1. The inlet of the restricted space 14 communicates with a funnel-shaped space 23, which permits the strip 1 to enter the restricted space 14 smoothly. The movable members 17a and 17b have a plurality of slots 24 arranged longitudinally of the restricted space in alignment with the fused portion of the tube so that the strip 1 in the restricted space 14, especially the fused portion thereof, can be cooled with air. Thus the tube 9 of a complete and specified shape is sent out from the restricted space 14. The inner surfaces of the top portions of the movable members 17a and 17b, namely the inner surfaces of said members in facing relation with portions of the strip 1 adjacent to the lateral surfaces 1a and 1b, are formed planar so that the lateral surfaces 1a and 1b may be brought into pressing contact in parallel with each other over the entire surfaces, whereby a groove is formed at the joint to prevent undesirable disfiguration of the tube.

The stationary and movable members 16, 17a and 17b may be replaced by at least three members arranged along the periphery of the restricted space 14 and movable relative to each other diametrically of the space 14. These members are herein generally referred to as pressing members 16 and 17.

The springs 22 may be replaceable by other springs acting to raise the movable pressing member 17 with a force smaller than the gravity acting on the member 17 with a force smaller than the gravity acting on the member 17 to control the force exerted on the strip 1. Conveniently, means such as one employing the aforesaid bolts 20 and nuts 21 is provided to control the raising force of the springs.

Figure 7:
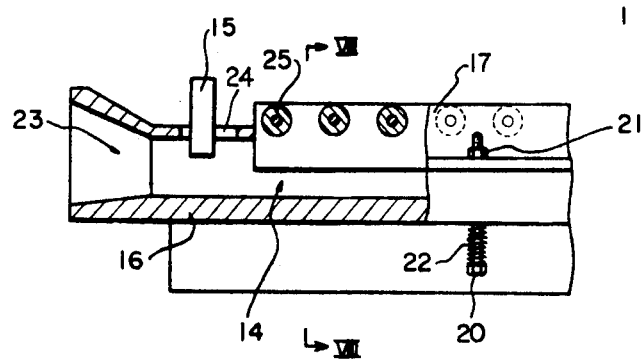
FIG. 7 is a side elevation partly broken away showing another embodiment of the restricted space defining means.
Figure 8:
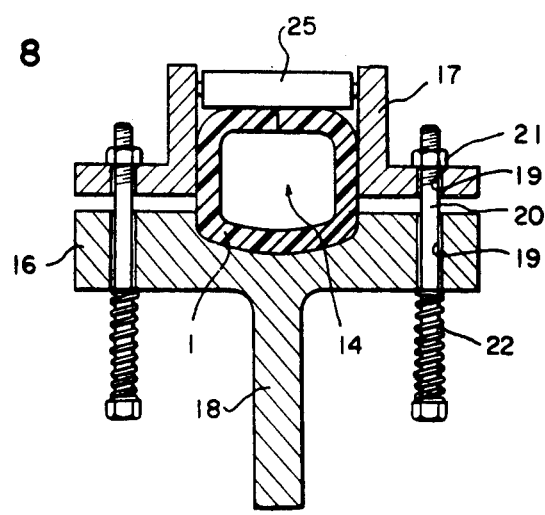
FIG. 8 is a view in section taken along the line VIII—VIII in FIG. 7

In order to reduce the frictional resistance between the pressing members 16, 17 and the strip 1 passing through the restricted space 14 and to thereby lower the tension on the strip 1, the present apparatus preferably includes the following means:

a. The pressing members 16 and 17 have pressing surfaces which are made of synthetic resin of low frictional resistance, such as fluorine-containing resin or silicone resin.

b. As shown in FIGS. 7 and 8, the movable pressing member 17 is provided with idle rollers 25 for pressing the strip 1. In these figures, the parts having the same construction and/or function as in the foregoing embodiment are referred to by like reference numerals and the description thereof is omitted.

c. The pressing members 16 and 17, for example, are made of sintered metal having many continuous pores to provide flow passages communicating with the restricted space 14 so that air, water or like fluid is forced against the outer surface of the strip 1 in the restricted space 14. As a result, the strip can be advantageously cooled simultaneously with the application of the fluid pressure.

Although the restricted space 14 according to the foregoing embodiments has a sufficient length in the direction of the travel of the strip 1 to join the lateral surfaces 1a and 1b of the strip and to shape the strip, shaping means of the air-cooled or water-cooled type may alternatively be provided independently of the restricted space 14.

What we claim is:

1. A method for producing a synthetic resin tube comprising the steps of transporting a strip of synthetic resin in its longitudinal direction, deforming the strip into a tubular shape having an axis extending in the longitudinal direction of the strip and at the same time bringing both lateral surfaces of the strip into pressing contact with each other to join said surfaces while passing the strip through a restricted space during transport, characterized in that the diameter of the restricted space is adjustable in accordance with the variation of the transverse dimension of the strip in its longitudinal direction by utilizing the internal stress of the strip passing therethrough.

2. The method as set forth in claim 1 wherein the strip is made of thermoplastic synthetic resin, and the strip is heated to a state shapeable by heating and a resulting tubular strip is shaped by cooling during transport.

3. The method as set forth in claim 2 wherein the strip is heated to such a degree that the strip will not return to its original shape when an external force is removed after it has been curved.

4. The method as set forth in claim 1 wherein at least one lateral surface of the strip is heated during transport before the lateral surface are pressed into contact with each other, and both the lateral surfaces are fused to each other.

5. The method as set forth in claim 1 wherein the strip is transversely curved during transport before the strip is sent into the restricted space.

6. The method as set forth in claim 1 wherein the tube is severed in suitable axial lengths at a terminal end of path of transport.

7. The method as set forth in claim 1 wherein the lateral surfaces of the strip are joined by pressing contact in parallel with each other.

* * * * *